United States Patent [19]

Sullivan et al.

[11] Patent Number: 4,911,451

[45] Date of Patent: Mar. 27, 1990

[54] GOLF BALL COVER OF NEUTRALIZED POLY(ETHYLENE-ACRYLIC ACID) COPOLYMER

[76] Inventors: Michael J. Sullivan, 58 Marlborough St., Chicopee, Mass. 01020; Terence Melvin, 24 Fox Hollow Rd., Somers, Conn. 06071; R. Dennis Nesbitt, 70 Deer Path La., Westfield, Mass. 01085

[21] Appl. No.: 330,383

[22] Filed: Mar. 29, 1989

[51] Int. Cl.$^4$ .................... A63B 37/12; C08L 33/02
[52] U.S. Cl. .................... 273/235 R; 273/DIG. 022; 260/998.14; 524/908; 525/196; 525/221
[58] Field of Search .................... 273/235 R; 524/908; 260/998.14; 525/196, 221

[56] References Cited

U.S. PATENT DOCUMENTS

| | | | |
|---|---|---|---|
| 4,526,375 | 7/1985 | Nakade | 524/908 |
| 4,567,219 | 1/1986 | Tominaga et al. | 524/908 |
| 4,679,795 | 7/1987 | Melvin et al. | 524/908 |

Primary Examiner—Allan M. Lieberman
Attorney, Agent, or Firm—Donald R. Bahr

[57] ABSTRACT

An improved golf ball comprising a core and a cover therefor, said cover comprises singularly or blends of a zinc neutralized ethylene-acrylic acid copolymer and a sodium neutralized ethylene-acrylic acid copolymer, or a blend of two or more zinc-neutralized ethylene-acrylic acid copolymers and a sodium-neutralized ethylene acrylic acid copolymer.

9 Claims, No Drawings

GOLF BALL COVER OF NEUTRALIZED POLY(ETHYLENE-ACRYLIC ACID) COPOLYMER

This invention relates to golf balls. More particularly, this invention relates to an improved golf ball cover useful in producing golf balls, particularly two-piece golf balls, exhibiting superior playability characteristics.

BACKGROUND OF THE INVENTION For many years balata and blends of balata with various elastomeric or plastic materials were the principal materials utilized in the manufacture of top quality golf balls. Balata and balata-containing cover compositions possess the desirable property of being readily adaptable to molding and, accordingly, can be easily compression molded about a spherical core to produce a high quality golf balls.

The relative softness of the balata cover is particularly advantageous in that a relatively experienced golfer can apply a spin to a balata-covered ball to control the ball in flight to produce a draw or a fade, or a backspin to cause the ball to "bite" or stop abruptly on contact with the green. Such playability is particularly important in short iron play where accuracy overrides distance considerations, and is exploited significantly by the more highly skilled players.

However, golf balls utilizing balata-based compositions as the covering are also quite susceptible to being cut easily if mis-hit and therefore such golf balls have a relatively short life span.

Due to this negative property, balata and it's synthetic substitutes, trans-polybutadiene and trans-polyisoprene, have today been essentially replaced by new cover materials, primarily by a copolymer of ethylene and methacrylic acid, sold by E. I. DuPont de Nemours and Company under the trademark SURLYN. Neutralization of a number of the acidic functional groups, generally on the order of from about 18 to about 73 percent, is effected with metal ions, such as zinc or sodium, producing a thermoplastic which has several advantages over balata when employed as the cover material for golf balls.

In addition to cost-saving and ready availability vis-a-vis balata, the properties of SURLYN may be controlled and varied to produce golf balls having different playing characteristics and properties which may be controlled and varied in hardness, cut resistance, shear resistance, and resilience. These properties can be varied by selection of suitable ethylene-methacrylic acid ratios, degree of neutralization and the particular metal ion employed.

While the use of SURLYN salts of poly(ethylene-methacrylic acid) copolymers as golf ball covers has been a major factor in the production of two-piece balls which for all practical purposes cannot be cut in play and which travel further when hit than any other USGA regulation ball as measured by controlled tests, the coefficient of restitution exhibited is an extremely important factor, with increased values resulting in increased distances which the ball will travel.

The golfing industry has therefor attempted for a numbers of years to develop a cover composition which possesses both the durability of the SURLYN salts of poly(ethylene-methacrylic copolymer) and increased coefficients of restitution.

It is therefore an object of the present invention to provide a golf ball which is resistant to cutting during play and which exhibits a markedly elevated coefficient of restitution.

It is another object of the invention to provide a golf ball which is longer, i.e., which does not have a distance shortcoming when struck with a golf club.

A further object of the present invention is to provide a golf ball which exhibits a bright white coloration and which does not yellow upon aging.

Still another object is to provide a golf ball cover composition which can be easily processed.

SUMMARY OF THE INVENTION

In accordance with the present invention, there is provided a golf ball comprising a core and a cover, said cover comprises a ionomer which has from about 10 to about 90 percent by weight of a poly ethylene-acrylic acid copolymer characterized by containing about 11 percent by weight acrylic acid with about 40 percent of the carboxylic acid groups neutralized by sodium ions, and ionomers which are from about 90 to about 10 percent by weight of at least one poly ethylene-acrylic acid characterized by containing from about 11 to 16 percent acrylic acid with from about 10 to about 40 percent of the carboxylic acid groups neutralized by zinc ions. Ionomers which are neutralized with lithium magnesium or other metal ions are also within the scope of this invention. Blends of ionomers as described above may also be used. The cover composition may further contain about 2.4 percent by weight of known additives, such as pigments, brightening agents and the like.

Examples of ethylene-acrylic acid copolymers found suitable for use in accordance with this invention either singularly or as blends are ionomers produced by Exxon Chemical Company and sold under the trademark ESCOR as ESCOR 562, 900, 906, 4000 and 4200.

ESCOR 562 is a zinc-neutralized copolymer of ethylene and acrylic acid containing 16 percent by weight acrylic acid with 40 percent of the acid groups zinc-neutralized and characterized by a melt index of 1.5 and a Shore D Hardness of 55.

ESCOR 900 is a sodium-neutralized copolymer of ethylene and acrylic acid containing 11 percent by weight acrylic acid with 40 percent of the acid groups sodium-neutralized and characterized by a melt index of 0.8 and a Shore D Hardness of 61.

ESCOR 906 is a zinc-neutralized copolymer of ethylene and acrylic acid containing 16 percent by weight acrylic acid with 10 percent of the acid groups zinc-neutralized and characterized by a melt index of 16 and a Shore D Hardness of 52.

ESCOR 4000 is a zinc-neutralized copolymer of ethylene and acrylic acid containing 16 percent by weight acrylic acid with 30 percent of the acid groups zinc-neutralized and characterized by a melt index of 2.5 and a Shore D Hardness of 55.

ESCOR 4200 is a zinc-neutralized copolymer of ethylene and acrylic acid containing 11 percent by weight acrylic acid with 15 percent of the acid groups zinc-neutralized and characterized by a melt index of 3.3 and a Shore D Hardness of 50.

As is discussed above in accordance with one embodiment of this invention, blends of sodium and zinc ionomers of poly ethylene-acrylic acid copolymers may be used as cover compositions. When blends of sodium and zinc ionomers are used the ratio of sodium ionomer to zinc ionomer can be from about 90% to about 10% and from about 10% to about 90%. A more preferred range is from about 75% to about 25% and from about 25% to about 75%. The preferred composition for use in this invention is 50% sodium ionomer and 50% zinc ionomer.

In formulating the novel blended cover compositions of the present invention, the sodium-neutralized copolymer, preferably ESCOR 900 may be blended with a single zinc-neutralized copolymer, preferably ESCOR 4000, or with blends of the zinc-neutralized copolymer within the blending parameters hereinbefore specified, as for example a blend of ESCOR 900 with ESCOR 562 and ESCOR 4000. Preferably, the cover compositions comprise a blend of ESCOR 900 and ESCOR 4000 and most preferably a blend wherein the ESCOR 900 and ESCOR 4000 are present in about 50% to 50% weight ratio.

It is within the purview of the present invention, as stated, to include in the cover compositions compatible materials which do not adversely affect the basic novel characteristics thereof including such art-recognized ingredients as pigments, stabilizers, optical brighteners, antioxidants and the like. Particularly, desirable ingredients are the pigments and optical brighteners disclosed in U.S. Pat. No. 4,679,795 to Melvin, et al, the disclosure of which is herein incorporated by reference thereto.

The preferred white basic color of the golf balls is formulated by pigmentation of the selected cover formulation. Suitable white pigments for use in accordance with this invention include titanium dioxide, zinc oxide and zinc sulfide. Fluorescent and non-fluorescent colored pigments may also be used in this invention. It is to be understood by those skilled in the art that covers other than white can be produced by adding colored dyes or pigments to the basic polymeric blend.

The amount of pigment used in conjunction with the polymeric cover composition naturally depends upon, inter alia, the particular pigment utilized, generally from about 1 to about 3 percent by weight based upon the weight of the ionomer. The most preferred pigment is titanium dioxide present in amounts of from about 0.5 to about 5 percent by weight based on the weight of ESCOR ionomers. A most preferred concentration for the titanium dioxide is about 2 percent based on the weight of the ionomers.

One of skill in the art is aware of the fact that there are various hues of white, e.g. blue white, yellow whites and the like. Preferably, in the present cover compositions, trace amount of a blue pigment are added to impart a blue white appearance thereto.

The subject invention is adapted to utilize a wide variety of optical brighteners.

One skilled in the art must choose an optical brightener which is compatible with the polymer used as a base cover stock and with the pigment used therein. In that optical brighteners have been utilized for a width variety of purposes in many different environments for many years, non-functional optical brighteners exist. Optical brighteners have been commercially utilized for the brightening of textiles in order to impart a desirable blue-white appearance. The applicant does not understand fully the ramifications of why some optical brighteners are functional while other optical brighteners are not functional. It is within the purview of one skilled in the art to select a functional optical brightener for use in the cover compositions of the present invention.

Examples of suitable optical brighteners which can be used in accordance with this invention are Uvitex OB as sold by the Ciba-Geigy Chemical Company, Ardsley, N.Y. Uvitex OB is thought to be 2,5-Bis(5-tert-butyl-2-benzoxazoly)thiopene. Examples of other optical brighteners suitable for use in accordance with this invention are as follows: Leucopure EGM as sold by Sandoz, East Hanover, N.J. 07936. Leucopure EGM is thought to be 7-(2h-naphthol(1,2-d)-triazol-2yl)-3phenyl-coumarin. Phorwhite K-2002 is sold by Mobay Chemical Corporation, P. O. Box 385, Union Metro Park, Union, N.J. 07083 is throught to be a pyrazoline derivative, Eastobrite OB-1 as sold by Eastman Chemical Products, Inc. Kingsport, Tenn. is thought to be 4,4-Bis(-benzoxazoly)stilbene.

Many optical brighteners are colored. The percentage of optical brighteners utilized must not be excessive in order to prevent the optical brightener from functioning as a pigment or dye in its own right.

The above-mentioned Uvitex and Eastobrite OB-1 are preferred optical brighteners for use in accordance with this invention.

The percentage of optical brighteners which can be used in accordance with this invention is from about 0.01% to about 0.5% as based on the weight of the polymer used as a cover stock. A more preferred range is from about 0.05% to about 0.25% with the most preferred range from about 0.5% to about depending on the optical properties of the particular optical brightner used and the polymeric environment in which it is a part.

Usually, the additives are admixed with a copolymer to be used in the cover composition to provide a masterbatch of desired concentration and an amount of the masterbatch sufficient to provide the desired amounts of additive is then admixed with the copolymer blend.

A most preferred cover composition for use in accordance with this invention consists of:

ESCOR 4000: 52.40 pbw
ESCOR 900: 45.2
Titanium dioxide: 2.35
Ultra-Blue: 0.024
Uvitex OB: 0.102

Golf balls utilizing the unique cover compositions of the present invention may be produced by the techniques currently employed in the art. For example, selected blends of ESCOR 4000 and ESCOR 900, admixed with the optional ingredients, can be injection molded on a prepositioned core in accordance with injection molding techniques commonly employed in the art. Likewise, covers can be produced by injection molding cover half shells, two of which can then be positioned around a golf ball core. The core and enveloping half shells are then placed in a compression mold, the shells fused together and dimples formed thereon in accordance with commonly accepted procedures.

The cover compositions may be applied to both solid and would type cores as are currently used in the art.

Experience has demonstrated that the average golfer prefers a glossy golf ball. In order to produce glossy golf balls, the balls of this invention may be coated with a clear epoxy-urethane or urethane-urethane system subsequent to molding. The system in question consists of a clear epoxy primer, followed by a clear urethane coat. Use of this clear coat system subsequent to the molding operation is not mandatory in order to achieve the desirable results of this invention; however, it is highly desirable. In the preferred embodiment, a water borne urethane primer is first applied followed by a clear solvent based urethane coating. In addition to high initial gloss, the above-mentioned system produces a golf ball which is durable and maintaining its gloss during play. It is understood by one skilled in the art that other clear coat systems can likewise be utilized.

One qualification for the optical brightener which is used in accordance with this invention is that the optical brightener in question must be compatible with the polymer system utilized and it must be stable at temperatures necessary for the injection molding of the golf ball cover onto a prepositioned core. This qualification is necessary if the above-described injection molding technique is utilized. If the compression molding technique is used in the formation of the ball, the optical brightener used in accordance with this invention must be stable at the temperature necessary for the injection molding of the half shell and the compression molding of the half shells around a preformed core.

The subject invention is useful in producing white golf balls wherein the whiteness of the ball is observed through a clear coat finish. It should be noted that this invention is likewise very useful in that it can provide a superior substrate if it is deemed to be desirable to paint the golf ball in a conventional manner with a white pigmented paint system. This procedure is advantageous in this instance in that a base of maximum whiteness is provided for the paint coating. Painting of a surface is desirable in situations where as a result of contamination by foreign matter the resulting finished golf ball must be painted. In the trade this is generally referred to as a dirty manufacturing process wherein impurities sometimes appear in the resulting finished product in such a manner that the overall appearance of the finished golf ball is cosmetically detrimentally affected. These slight cosmetic defects can be hidden by using a single coat of white paint over the optically brightened surface of this invention in place of the more standard two coats of white paint. In this manner the cosmetic defects are hidden and a truly superior product is produced.

In the subject specification and claims, the term "core" is utilized to define the central part of the finished golf ball. As used in this specification and claims the term "core" refers to both solid centers as are used in two-piece golf balls, and to wound centers which are commonly used in balls which are referred to in the trade as three-piece golf balls.

The following examples serve to illustrate the present invention, such examples given for the purpose of illustration and not to be considered as limiting the invention. In the examples, all values are expressed as parts by weight unless otherwise indicated.

EXAMPLES

In the following examples, golf balls were produced using the cover compositions of the present invention, controls and comparative cover compositions by positioning a solid, preformed, cross-linked polybutadiene core in an infection molding cavity in such a manner as to permit the uniform injection of the selected cover composition around each core. All materials were molded under essentially identical settings.

In conducting the comparative prior art testing, SURLYN 9910 and SURLYN 8940 ionomers were utilized. Further, these surlyn ionomers were blended with various ESCOR copolymers to evaluate the properties of the cover composition of this invention.

SURLYN 9910 is a zinc-neutralized copolymer of ethylene and methacrylic acid characterized by a melt index of 0.7 and a Shore D Hardness of 64.

SURLYN 8940 is a sodium-neutralized copolymer of ethylene and methacrylic acid characterized by a melt index of 2.8 and a Shore D Hardness of 65.

In the examples as set forth in Table I, SURLYN White MB refers to a masterbatch having the following composition.

SURLYN 8528: 50 parts by weight (pbw)
Titanium dioxide: 15.86
Ultra-Blue: 0.16
Uvitex OB: 0.70
Santonex R: 0.025

In the examples as set forth in Table I Escor masterbatch (escor White MB) has the following composition:

ESCOR 4000: 50 parts by weight (pbw)
Unitane 0-110: 15.86
Ultra-Blue: 0.16
Uvitex OB: 0.70
Santonex R: 0.025

Coefficient of restitution was measured by firing the resulting golf ball in an air cannon at a velocity of 125 feet per second against a steel plate which is positioned 12 feet from the nozzle of the cannon. The rebound velocity was then measured. The rebound velocity was divided by the forward velocity to give the coefficient of restitution. The superior coefficients of restitution of the cover compositions of the present invention, are detailed in Table I.

TABLE I

| | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 | 26 | 27 |
|---|---|---|---|---|---|---|---|---|---|---|---|---|---|---|---|---|---|---|---|---|---|---|---|---|---|---|---|
| ESCOR 4000 | — | 90.4 | 45.2 | — | — | — | — | — | — | — | — | — | — | — | — | — | — | — | — | — | — | — | — | — | — | — | — |
| ESCOR 562 | — | — | — | 90.4 | — | — | — | — | — | — | — | — | — | — | — | — | — | — | — | — | — | — | — | — | — | — | — |
| ESCOR 900 | — | — | — | — | 90.4 | — | 45.2 | — | — | — | — | — | 45.2 | 45.2 | 45.2 | 22.6 | 21.9 | — | 45.2 | 81.4 | 72.3 | 63.3 | 54.2 | 36.2 | 27.1 | 18.1 | 9.0 |
| SURLYN 8940 | 68.5 | — | — | — | — | 68.5 | — | 45.2 | — | — | — | 45.2 | — | 45.2 | 45.2 | 22.6 | 68.5 | — | 45.2 | 9.0 | 18.1 | 27.1 | 36.2 | 54.2 | 63.3 | 72.3 | 81.4 |
| SURLYN 9910 | 21.9 | — | 33.9 | — | — | 21.9 | 33.9 | 33.9 | — | — | 68.5 | 33.9 | 33.9 | — | — | 33.9 | — | 68.5 | — | — | — | — | — | — | — | — | — |
| SURLYN White MB | 9.6 | 9.6 | 11.3 | 9.6 | 9.6 | 9.6 | 11.3 | 11.3 | 90.4 | 90.4 | 21.9 | 11.3 | 11.3 | — | — | 11.3 | — | 21.9 | — | — | — | — | — | — | — | — | — |
| ESCOR White MB | — | — | 9.6 | — | — | — | 9.6 | 9.6 | 9.6 | 9.6 | 9.6 | 9.6 | 9.6 | 9.6 | 9.6 | 9.6 | 9.6 | 9.6 | 9.6 | 9.6 | 9.6 | 9.6 | 9.6 | 9.6 | 9.6 | 9.6 | 9.6 |
| Compression | 62 | 60 | 54 | 55 | 56 | 54 | 55 | 53 | 57 | 55 | 48 | 48 | 50 | 47 | 48 | 47 | 49 | 51 | 52 | 51 | 51 | 52 | 54 | 50 | 50 | 52 | 51 |
| C.O.R. | 799 | 787 | 800 | 796 | 794 | 796 | 797 | 797 | 797 | 795 | 809 | 805 | 806 | 811 | 811 | 808 | 808 | 814 | 819 | 814 | 817 | 818 | 818 | 828 | 818 | 816 | 813 |
| Durability[b] | NB | 2B | NB | 11b | NB | NB | 1B | 1B | NB | 4B | NB | NB | NB | NB | NB | NB | NB | NB | NB | NB | NB | NB | NB | NB | NB | 1B | NB |
| Cold Crack[b] | NB | 1B | NB | NB | NB | NB | 3B | NB | NB | 4B | NB | NB | NB | 3B | NB | NB | NB | NB | NB | NB | NB | NB | NB | NB | NB | NB | NB |
| Cut Resistance[d] | 3-4 | 3-4 | 3-4 | 2-3 | 3-4 | 3-4 | 3-4 | 4 | 4 | 3-4 | 4-5 | 4-5 | 4-5 | 4-5 | 4-5 | 4-5 | 4-5 | 4-5 | 4-5 | 4-5 | 4-5 | 4-5 | 4-5 | 4-5 | 4-5 | 4-5 | 4-5 |

[a]Controls - Examples 1-3, 4-10, 11-17 and 18-27 were run as separate sets
[b]One dozen tested each Example, NB = none broke
[c]300 blows, 1 dozen tested each Example, NB = none broke
[d]Graded 1 through 5 from 1 = clean cut to 5 = no mark Shore hardness was measured in accordance with ASTM Test D-2240.

Cut resistance was measured in accordance with the following procedure. A golf ball is fired at 135 feet per second against the leading edge of a pitching wedge, wherein the leading edge radius is 1/32 inch, the loft angle is 51 degrees, the sole radius is 2.5 inches, and the bounce angle is 7 degrees.

The cut resistance of the balls tested herein was evaluated on a scale of 1–5. 1 represents a cut that extends completely through the cover to the core; a 2 represents a cut that does not extend completely through the cover but that does break the surface; a 3 does not break the surface of the cover but does leave a permanent dent; a 4 leaves only a slight crease which is permanent but not as severe as 3; and a 5 represents virtually no visible indentation or damage of any sort.

DISCUSSION OF THE EXAMPLES

The examples set forth in the foregoing table compares the properties of the golf balls of the present invention (Examples 14, 15, 17 and 19–27) with those of standard SURLYN cover balls of the prior art (Examples 1, 6, 11 and 18), with those of golf balls utilizing single ESCOR polymer-based covers (Examples 2, 4, 5) with those incorporating various ESCOR-SURLYN blends (Examples 3, 7, 8, 12, 13, 16) and with those utilizing single SURLYN ionomers (Examples 9 and 10).

As can be readily appreciated from review of the tabled results, the novel cover compositions of the present invention, while exhibiting the durability associated with golf balls having SURLYN neutralized poly(ethylene-methacrylic acid) copolymer-based cover compositions, clearly provides for a pronounced elevated coefficient of restitution.

It should also be noted that, in addition to providing golf balls of superior play properties, the use of the ESCOR blends of the present invention results in substantial cost saving when compared to prior art golf balls.

The invention has been described with reference to particular embodiments, but it is to be understood that variations and modifications can be effected without departing from the spirit and scope of the invention.

What is claimed is:

1. A golf ball comprising a core and a cover, wherein said cover comprises a blend of from about 10% to about 90% by weight of an ethylene-acrylic acid copolymer which is neutralized with a sodium ion, and about 90% to 10% by weight of an ethylene-acrylic acid copolymer which is neutralized with a zinc ion.

2. The golf ball as defined by claim 1 wherein said cover comprises from about 25% to about 75% by weight of said metal ion neutralized ethylene-acrylic acid copolymer and from about 75% to about 25% by weight of said zinc ion neutralized ethylene-acrylic acid copolymer.

3. A golf ball comprising a core and a cover, wherein said cover comprises a blend of from about 10% to about 90% by weight of an ethylene-acrylic acid copolymer containing about 11% by weight acrylic acid having about 40% of the carboxylic acid groups neutralized with sodium ions, and from about 90% to about 10% by weight of at least one ethylene-acrylic acid copolymer containing from about 11% to about 16% by weight acrylic acid with from about 10% to about 40% of the carboxylic acid groups neutralized by zinc ions and about 2.4% by weight of additives compatible therewith.

4. A golf ball as defined by claim 3 wherein said cover comprises from about 25% to about 75% by weight of said sodium-neutralized ethylene-acrylic acid copolymer and from about 75% to about 25% by weight zinc-neutralized ethylene-acrylic acid copolymer.

5. A golf ball as defined by claim 3 wherein said cover comprises about 45.2% by weight of sodium-neutralized ethylene-acrylic acid copolymer and about 52.4% by weight zinc-neutralized ethylene-acrylic acid copolymer.

6. A golf ball as defined in claim 3 wherein the zinc-neutralized copolymer component of said blend is a mixture of zinc-neutralized ethylene-acrylic acid copolymers.

7. The golf ball of claim 1 wherein said cover comprises a mixture of one or more pigments, an optical brightener, and/or dye.

8. The golf ball of claim 3 wherein said additives comprise a mixture of one or more pigments, an optical brightener, and/or dye.

9. The golf ball of claim 1 wherein the cover further incorporates an ionomer which is a partially neutralized ethylene-methacrylic acid copolymer.

* * * * *